Feb. 25, 1941. A. McDONALD 2,233,174
APPARATUS FOR MANUFACTURING CONTOURED SHEETS FROM VULCANIZABLE MATERIAL
Filed June 13, 1938 2 Sheets-Sheet 1
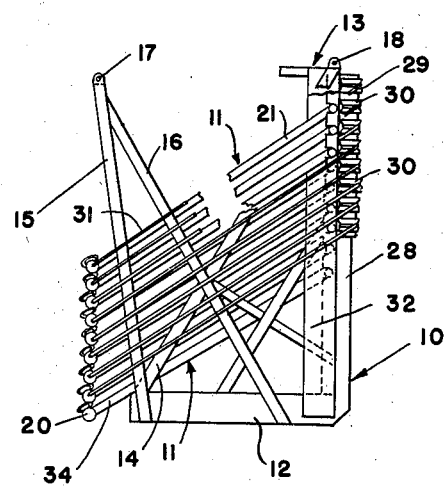
FIG. 1.
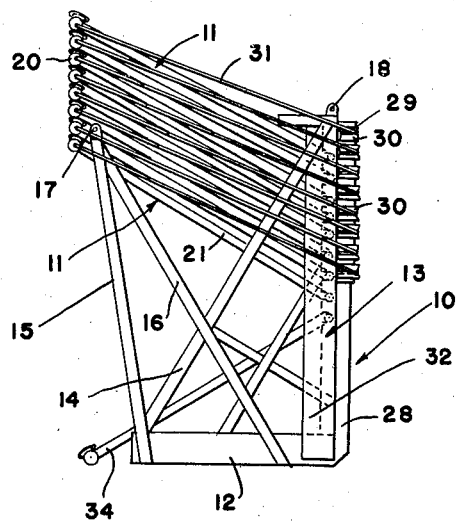
FIG. 2.
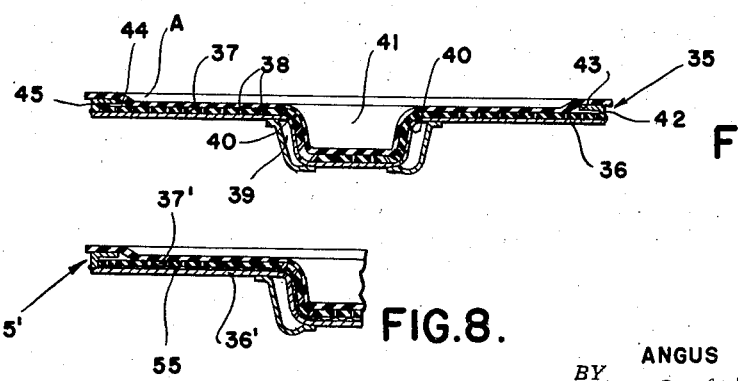
FIG. 7.
FIG. 8.
INVENTOR
ANGUS MC DONALD
BY
ATTORNEYS Feb. 25, 1941.        A. McDONALD        2,233,174
APPARATUS FOR MANUFACTURING CONTOURED SHEETS FROM VULCANIZABLE MATERIAL
Filed June 13, 1938        2 Sheets-Sheet 2
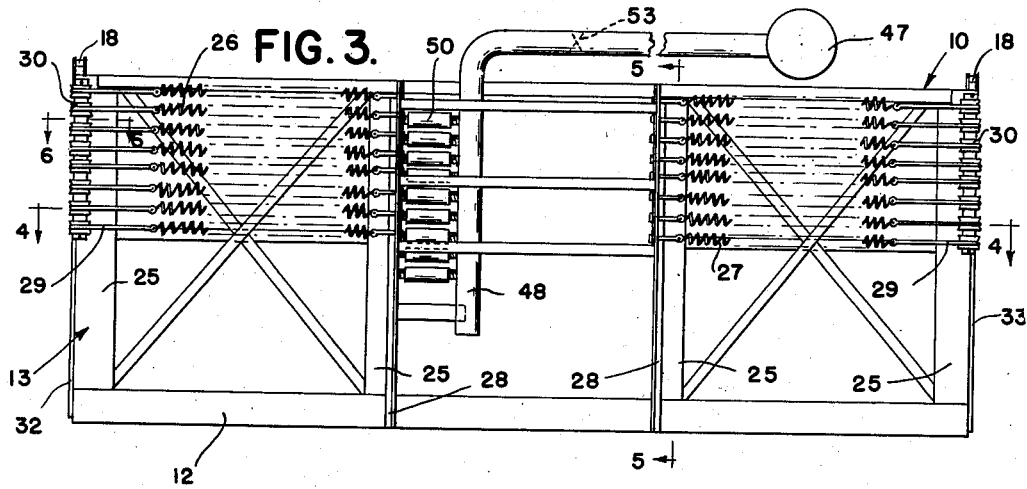
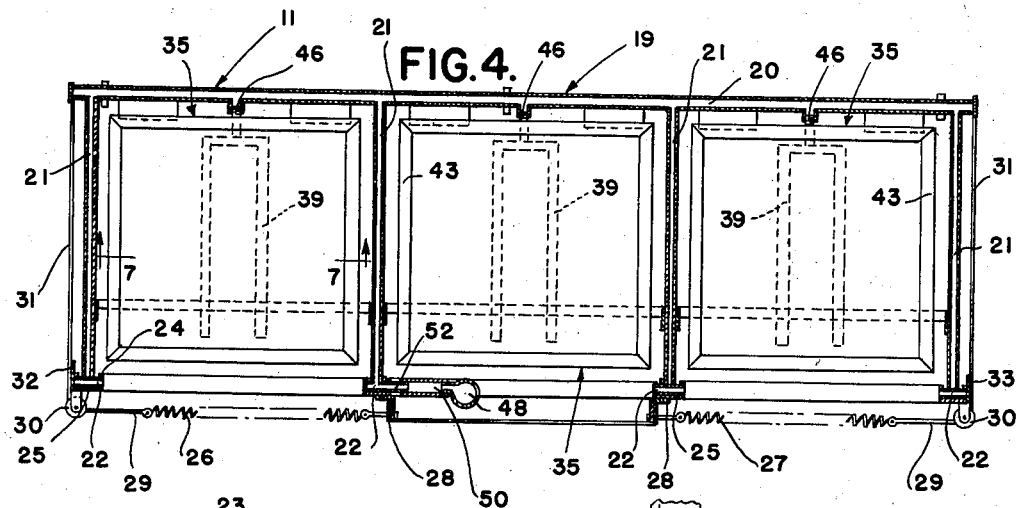
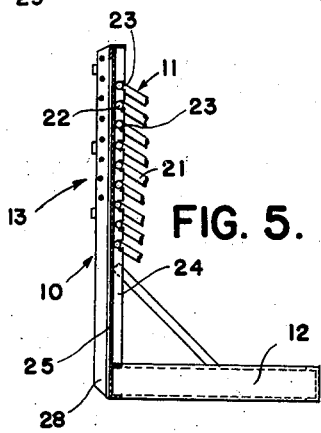
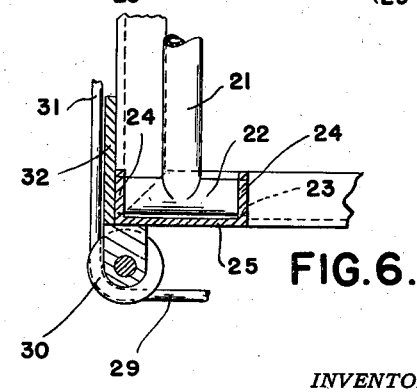
INVENTOR
ANGUS McDONALD
BY
ATTORNEYS Patented Feb. 25, 1941

2,233,174

UNITED STATES PATENT OFFICE 2,233,174

APPARATUS FOR MANUFACTURING CONTOURED SHEETS FROM VULCANIZABLE MATERIAL

Angus McDonald, Pontiac, Mich., assignor to Baldwin Rubber Company, Pontiac, Mich., a corporation of Michigan Application June 13, 1938, Serial No. 213,541

7 Claims. (Cl. 18—19)

This invention relates generally to the manufacture of mats or coverings of vulcanizable stock and refers more particularly to improvements in apparatus employed for this purpose.

One of the principal objects of this invention consists in the provision of a relatively simple compact apparatus rendering it possible to cure a plurality of vulcanizable sheets simultaneously to pre-selected contours and having provision for effectively clamping the sheets against the contoured forms.

Another object of this invention consists in the provision of apparatus of the type set forth in the preceding paragraph wherein the sheets of stock to be cured are held in intimate contacting relation to the contoured surfaces of the respective forms by differential pressure and wherein an effective seal is provided around the marginal edges of the sheets to prevent the escape of air or fluid beneath the sheets.

A further feature of this invention consists in the provision of curing apparatus having a supporting tray for the contoured form equipped with a tubular frame communicating with a vacuum line and also communicating with the joint between the adjacent surfaces of the stock and form. As a result, the sheet of stock to be cured is drawn against the contoured surface of the form by vacuum and the sheet is thereby effectively clamped to the form throughout the area thereof.

Still another object of this invention resides in the provision of curing apparatus embodying a plurality of trays supported in superposed relation on a rack for swinging movement independently of each other between two positions and having provision for holding the trays in either of the two positions.

A still further advantageous feature of this invention consists in the provision of curing apparatus having a vacuum manifold communicating with the suction side of a vacuum pump and respectively communicating with the tubular frame of each of the trays in such a manner as to permit uninterrupted swinging movement of the trays between the two positions aforesaid thereof.

In addition to the foregoing, this invention contemplates an improved construction of contoured form having provision for not only insuring intimate contacting relation of the sheet with the adjacent surface of the form, but for also effecting a fluid-tight seal around the marginal edges of the sheet.

The foregoing, as well as other objects, will be made more apparent as this description proceeds, especially when considered in connection with the accompanying drawings, wherein—

Figure 1 is an end elevational view of curing apparatus constructed in accordance with this invention;

Figure 2 is a view similar to Figure 1 showing the parts in another position;

Figure 3 is a rear elevational view of the apparatus shown in Figure 1;

Figure 4 is a longitudinal sectional view taken substantially on the plane indicated by the line 4—4 of Figure 3;

Figure 5 is a cross sectional view taken substantially on the plane indicated by the line 5—5 of Figure 3;

Figure 6 is a detailed sectional view taken substantially on the plane indicated by the line 6—6 of Figure 3;

Figure 7 is a sectional view taken substantially on the plane indicated by the line 7—7 of Figure 4; and Figure 8 is a sectional view of a slightly modified form of construction.

The curing apparatus, selected herein for the purpose of illustration, comprises a rack 10 and a plurality of trays 11 supported in superposed relationship on the rack for swinging movement independently of each other between the two positions indicated in Figures 1 and 2. The rack 10 is shown in Figures 1 to 5, inclusive, as comprising a frame having a base section 12 and a vertically extending section 13 secured at the lower end thereof to the base 12. Upon reference to Figures 1 and 2, it will be noted that the section 13 extends upwardly from one side of the base 12 and the opposite ends thereof are connected to the corresponding ends of the base 12 by means of diagonal braces 14. It will also be observed from the above figures that a hanger bar 15 extends upwardly from each end of the base 12 at the side of the latter opposite the section 13 and the upper ends of the hanger bars are braced from the base by means of the diagonal supporting elements 16. In the present instance, a pin, 17 is carried by the upper end of each hanger bar 15 and a similar pin 18 is secured to the top of the section 13 at each end of the latter. These pins are adapted to be engaged by suitable conveyor hooks (not shown) for transporting the rack and trays from one point to another.

Upon reference to Figure 4, it will be noted that each of the trays 11 is provided with a tubular frame 19 comprising a longitudinally extending tube 20 at the front side and tubes 21 extending rearwardly from the tube 20 in a common plane with the latter. The forward ends of the tubes 21 communicate with the interior of the tube 20 and the rear ends of the tubes 21 are secured to tubular nipples 22 which extend parallel to the tube 20.

As shown in Figures 4 to 6, inclusive, the opposite ends of each of the nipples 22 are adapted to be received in slots 23 formed in the flanges 24 of the vertically extending channel-shaped stanchions 25 on the section 13 of the rack. Upon reference to Figure 5, it will be noted that the slots 23 are spaced vertically from each other in the stanchions 25 and cooperate with the nipples 22 at the rear ends of the tubes 21 on each tray to pivotally support the trays on the rack 10.

The nipples 22 on each tray are maintained in assembled relationship with the respective slots 23 in the channel-shaped stanchions 25 by means of a pair of springs 26 and 27 positioned at the rear sides of the trays. The inner or adjacent ends of the springs 27 are anchored to suitable angle irons 28 secured to the vertical section 13 and the outer ends of the springs are connected to flexible cables 29. Upon reference to Figure 4, it will be noted that the cables 29 are respectively reeved over pulleys 30 rotatably supported at opposite ends of the section 13 in a common horizontal plane in a manner to permit the free end portions 31 of the cables to be extended along the opposite ends of the tray. The free ends of the portions 31 of the cables 29 are secured to opposite ends of the tube 20 extending along the front side of the tray and the springs 26, 27 are normally under tension so that the nipples 22 on the trays are yieldably held in engagement with the slots 23 in the channel-shaped stanchions 25.

Upon reference to Figures 1 and 2, it will be noted that the sets of pulleys 30 are so positioned with respect to their respective trays that the cables associated with each tray move across the axis of pivotal connection during swinging movement of the trays between the two positions shown in Figures 1 and 2. In other words, the springs 26 and 27 also serve to hold the trays in either of the two positions shown in Figures 1 and 2. It may be pointed out at this time that the trays are prevented from endwise movement relative to the rack 10 by means of vertical strips 32 and 33 secured to the opposite ends of the vertical section 13 of the rack in positions to abut the end nipples 22 on the trays. Attention may also be called to the fact that although the bottom tray 34 is identical in construction to the trays 11, it is not necessary for this tray to swing between the two positions referred to and, accordingly, the nipples 22 at the rear side of this tray may be bolted, or otherwise permanently secured to the vertical section 13 of the rack.

Referring again to Figure 4 of the drawings, it will be noted that the two intermediate rearwardly extending tubes 21 of each tray cooperate with the end tubes to form three sections. Supported within the confines of each section in the plane of the tray is a form 35. As shown in Figure 7, each form 35 comprises a supporting plate 36 having a contour corresponding to the shape it is desired to impart to the sheet of stock during the curing operation and having the top surface covered with a sheet of non-metallic material, such as rubber 37. The sheet 37 is formed with a plurality of relatively closed spaced apertures 38 therethrough adapted to be covered by a sheet of uncured stock A and communicating with a vacuum chamber 39 through the medium of the openings 40 in the supporting plate 36.

In the present instance, it is desired to form a relatively deep channel 41 in the uncured sheet of stock A and, accordingly, the supporting plate 36, as well as the covering 37, are fashioned with a corresponding channel. The vacuum chamber 39 is shown as extending along opposite sides of the channel and the openings 40, communicating with the vacuum chamber, are formed in the latter sides of the channel. As a consequence, when air is withdrawn from the vacuum chamber 39, the vacuum pull on the sheet of uncured stock A is greater in the region of the channel and drawing of the uncured stock A into the channel by the vacuum is insured. It will, of course, be understood that the vacuum chamber 39 will withdraw air through the joint between the adjacent surfaces of the plate 36 and covering 37 to also effectively clamp the remaining portions of the sheet A against the form of covering material 37.

In order to effectively cure the stock to the exact contour of the form, it is also desirable to provide a fluid tight seal around the marginal edges of the stock. As shown in Figure 7, the plate 36 is provided with a side wall 42 extending continuously around the margin of the covering material 37 and having an inwardly extending flange 43 overlapping the marginal portion of the covering material in spaced relation thereto. The flange 43 also extends continuously around the marginal edge of the covering 37 and is adapted to be overlapped by the free marginal edge portions of the uncured stock A. As a result, a chamber or space 44 is provided which extends completely around the margin of the form and this space communicates with the vacuum chamber 39 through the space 45 provided between the underside of the flange 43 and the covering 37. The arrangement is such that the pressure in the continuous chamber or space 44 is less than the pressure acting upon the exposed face of the sheet A and the differential is sufficient to effectively clamp the marginal edge of the sheet A against the flange 43 to prevent the escape of air or fluid beneath the uncured stock.

In accordance with the present invention, the vacuum chambers 39 of the forms on each tray communicate with the interior of the tubular frame 19 through the medium of a nipple 46, shown in Figure 4 of the drawings. The tubular frame 19 of each tray, on the other hand, communicates with a vacuum pump 47 through the medium of a manifold 48 secured to the rack 10 in the manner clearly shown in Figure 3. The manifold 48 extends vertically of the section 13 at the rear side of the rack and communicates with a series of nipples 50, corresponding in number to the number of trays on the rack. Upon reference to Figure 4, it will be noted that one of the nipples 22 on each rack is provided with an extension 52 adapted to telescopically engage the adjacent nipple 50 on the manifold 48. In other words, the construction is such as to provide communication between the tubular frame of each rack and the suction side of the vacuum pump without interfering with swinging movement of the trays between the two positions shown in Figures 1 and 2.

Referring now to the operation of the rack, it will be noted that the trays assume the relative positions thereof shown in Figure 2 during the loading operation and, at this time, the valve 53 in the vacuum line from the pump 47 is open so that the sheets of material placed on the forms are effectively drawn against the forms to assume the contour of the latter. As soon as the forms 35 on the lower tray 34 are loaded with sheets of uncured stock A, the next tray is swung downwardly to its lowermost position wherein the operator may readily place sheets of stock on the forms carried thereby. This operation is repeated until all of the trays are loaded and at this time the trays assume the relative positions shown in Figure 1. Upon completion of the loading operation, the rack is bodily moved into a suitable heating chamber (not shown) wherein the sheets of uncured stock are vulcanized to the contour of the respective forms. In this connection, attention may be called to the fact that the forms may either be of the same contour or different contours, depending upon whether all of the sheets are to be cured to the same shape. After the curing operation, the valve 53 may be closed, if desired, and the mats on the uppermost tray removed. This tray is then swung to its uppermost position, shown in Figure 2, and the mats on the next adjacent tray are removed. This operation is repeated until all of the mats have been removed, at which time the trays assume the positions thereof shown in Figure 2.

In Figure 8 of the drawings, I have shown a slightly different construction of form which may be supported on the trays in the same manner as form 35. As a matter of fact, the only difference between the form 35' and the form illustrated in Figure 7 is that a screen or a sheet of foraminated material 55 is located between the adjacent surfaces of the covering 37' and the supporting plate 36'. The screen 55 influences the vacuum pull between the covering material and the supporting plate 36', with the result that the sheet of stock to be cured is more effectively clamped against the form.

What I claim as my invention is:

1. In apparatus for curing sheets of vulcanizable stock to a predetermined contour, a form having a surface adapted to support a sheet of uncured stock and having a chamber communicating with the joint between adjacent surfaces of the stock and form, a tubular frame supporting the form and communicating with the chamber, and means for withdrawing air from the chamber through said tubular frame.

2. In apparatus for curing sheets of vulcanizable stock to a predetermined contour, a tray supported for swinging movement between two positions and having a tubular frame bar, a form mounted on the tray and having a surface adapted to support a sheet of uncured stock, means establishing communication between the tubular frame bar and the joint between adjacent surfaces of the stock and form, and means communicating with the tubular frame bar through the axis of pivotal movement of the tray to withdraw air from said frame bar.

3. In apparatus for curing sheets of vulcanizable stock to a predetermined contour, a rack having a vacuum manifold supported thereon, a tray pivotally mounted on the rack for swinging movement between two positions and comprising a supporting frame having a tubular frame bar communicating with the manifold through the axis of swinging movement of the tray, a plurality of forms mounted on the supporting frame of the tray and having surfaces adapted to support sheets of uncured stock, means establishing communication between the tubular frame bar of the supporting frame and the joints between adjacent surfaces of the stock and forms, and means for withdrawing air from said manifold.

4. In apparatus for curing sheets of vulcanizable stock to a predetermined contour, a rack having a vacuum manifold supported thereon, a plurality of trays supported on the rack in superposed relationship and for swinging movement between two positions, each tray comprising a supporting frame having a tubular frame bar communicating with the vacuum manifold, a form mounted on the supporting frame of each tray and having a surface adapted to support a sheet of uncured stock, means establishing communication between the tubular frame bar of each frame and the joint between adjacent surfaces of the form and sheet of stock and the associated frame, and means establishing communication between the vacuum manifold and the tubular frame bar of each tray.

5. In apparatus for curing sheets of vulcanizable stock to a predetermined contour, a rack having a vacuum manifold supported thereon, a plurality of trays supported on the rack in superposed relationship and each tray comprising a supporting frame having a tubular frame bar pivotally engaging the rack to permit swinging movement of the supporting frames between two positions, a form mounted on the supporting frame of each tray and having a surface adapted to support a sheet of uncured stock, means establishing communication between the tubular frame bar of each frame and the joint between adjacent surfaces of the form and sheet of stock carried by the frame, means establishing communication between the vacuum manifold and the tubular frame bar of each tray through the axis of pivotal movement of the respective trays, and means for withdrawing air from the vacuum manifold.

6. In apparatus for curing sheets of vulcanizable stock to a predetermined contour, a rack having a vacuum manifold supported thereon, a tray having a tubular frame provided with nipples pivotally engaging the rack in a manner to permit swinging movement of the tray between two positions, a form supported on the tray and having a surface adapted to support a sheet of uncured stock, means establishing communication between the tubular frame and the joint between adjacent surfaces of the stock and form, means establishing communication between one of the nipples and vacuum manifold, and means for withdrawing air from the vacuum manifold.

7. In apparatus for curing sheets of vulcanizable stock to a predetermined contour, a rack having a vertically extending section, a suction manifold mounted on the rack and extending vertically, a plurality of trays mounted on the vertical section of the rack in spaced relation one above the other and each tray having a supporting frame provided with a tubular frame member, a contoured form mounted on each tray and adapted to support a sheet of stock on the top surface thereof, means pivotally connecting each supporting frame to the vertical section of the rack to provide for successively swinging the trays between two positions of rest, said means including axially bored pivot pins communicating with the suction manifold and respectively engaging the tubular members of the frames, and means establishing communication between the tubular frame member of each frame and the joint between adjacent surfaces of the form and sheet of stock carried by the frame whereby the stock is clamped against the forms by the suction in said manifold.

ANGUS McDONALD.